Figure 1:
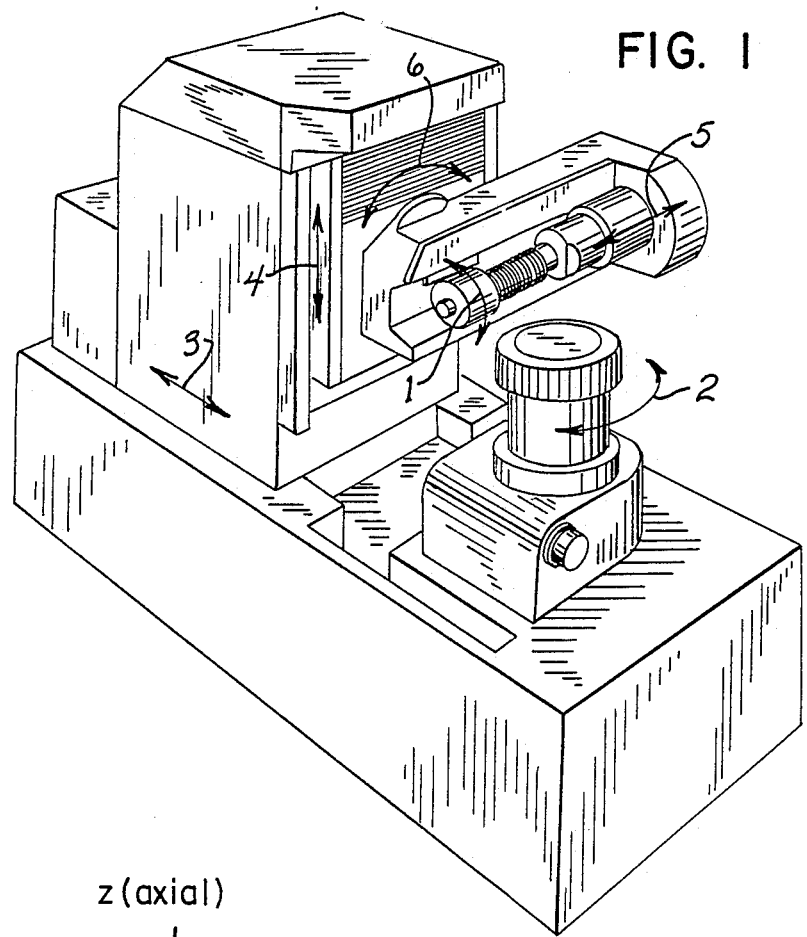

United States Patent [19]
Sulzer

[11] Patent Number: 4,961,289
[45] Date of Patent: Oct. 9, 1990

[54] MACHINE TOOL FOR FINE MACHINING THE TOOTH FLANKS OF PRETOOTHED GEARWHEELS

[75] Inventor: Gerd Sulzer, Wiggensbach, Fed. Rep. of Germany

[73] Assignee: Liebherr-Verzahntecknik GmbH, Fed. Rep. of Germany

[21] Appl. No.: 410,015

[22] Filed: Sep. 20, 1989

Related U.S. Application Data

[63] Continuation of Ser. No. 163,982, Mar. 4, 1988, abandoned.

[30] Foreign Application Priority Data

Mar. 10, 1987 [DE] Fed. Rep. of Germany ....... 3707664

[51] Int. Cl.⁵ .............................................. B24B 19/00
[52] U.S. Cl. .................... 51/105 GG; 51/95 GH; 51/287; 409/11
[58] Field of Search ..... 51/95 GH, 105 GG, 105 HB, 51/287, DIG. 1; 409/11, 33

[56] References Cited

U.S. PATENT DOCUMENTS 2,214,225  9/1940  Drummond ............................ 409/33
3,550,330  12/1970  Nakamura ..................... 51/95 GH X

FOREIGN PATENT DOCUMENTS 1168742   8/1964   Fed. Rep. of Germany .
2301312   7/1974   Fed. Rep. of Germany .
1150961   9/1982   Fed. Rep. of Germany .
50-28097  3/1975   Japan .
4881547   3/1975   Japan .
48-81546  4/1975   Japan .
57-38361  12/1982  Japan .
662327    5/1979   U.S.S.R. .......................... 51/105 G

OTHER PUBLICATIONS

Reishauer brochure Jun. 1986.

*Primary Examiner*—James G. Smith
*Attorney, Agent, or Firm*—Andrus, Sceales, Starke & Sawall

[57] ABSTRACT

A tool for fine machining the tooth flanks of pretoothed gearwheels is described. The flanks of the gearwheel are subjected to a worm-shaped tool by the hobbing method. The tool is made of an elastic synthetic material with embedded granular grinding material. It is advantageous for the worm-shaped tool to be lined up with a conventional grinding worm on a tool spindle. The microfinish of the gearwheel, i.e. the polishing, can then take place on one and the same machine directly following the grinding.

11 Claims, 2 Drawing Sheets

MACHINE TOOL FOR FINE MACHINING THE TOOTH FLANKS OF PRETOOTHED GEARWHEELS

This is a continuation of application Ser. No. 07/163,982, filed 03/04/88, now abandoned.

The present invention relates to a machine tool for fine machining the tooth flanks of pretoothed gearwheels, comprising a tool spindle bearing a grinding worm and capable of being rotated in rolling coupling with the workpiece carrier, said spindle being mounted in a reciprocating tool slide arrangement by means of which the grinding worm can be imparted a working stroke and a following return stroke with respect to the workpiece.

In gear tooth forming methods involving hobbing, the tooth profile comes about by small cuts, i.e. the tooth flank is not formed exactly, but approximated by a finite number of small cuts in facet-like fashion. Each small cut of the cut profile touches the theoretical involute profile at one point; all other points deviate from the involute profile. The advance markings arising from the axial feed of the tool are superimposed on the small cut markings in the profile direction. These markings oriented in the longitudinal direction of the tooth have a disturbing effect on the rolling of gearwheel pairs and lead to undesirable noise.

A number of fine machining methods are known, for example honing or lapping, for eliminating these deviations from the involute form. These methods are referred to as shaving methods, which follow the fine machining methods such as hob grinding or hob peeling. These shaving methods typically reduce the surface roughness of the flanks of the gearwheel to less than 4 micrometers.

U.S. Pat. No. 2,214,225 discloses disposing two scraping wheels with different working properties one axially behind the other on a common spindle and subjecting the gearwheel to be machined, by an axial shift of the tool, first to one scraping wheel and then to the other scraping wheel. In order to maintain engagement between the tool and the workpiece during the switch-over, a smaller blind wheel is disposed between the scraping wheels for ensuring during the switch-over that the relative position of the tool and workpiece is maintained. The scraping of gearwheels is a method which can be used effectively only when the gearwheels are in an unhardened state, so that distortion errors during hardening impair the final quality.

Hob grinding has recently become more and more widely used for fine machining pretoothed gearwheels, wherein a grinding worm is rolled off the tooth flanks of the gearwheel to be finished by the hobbing principle. Such grinding machines are known; a typical construction is described and shown under the name RZ 300E in the pamphlet of the Reishauer company (Kd. 1 182 200).

The grinding worms used for grinding cause relatively great surface roughness which, furthermore, has an unfavorable orientation and therefore leads to a relatively high noise level. This problem can only be solved either by using a smaller grain, which reduces the performance to uninteresting ranges, or by polishing or honing the gearwheels after grinding again. Polishing usually takes place on separate machines whose kinematics in turn correspond to the known hobbing or hob grinding machines. However, the workpieces must be separately clamped into these machines and resynchronized. The resulting resetting and nonproductive times add up to a value unacceptable in modern gearwheel production.

German "offenlegungsschrift" No. 23 01 312 discloses a worm-shaped tool for honing gearwheels, which is made of a flexible synthetic material with embedded abrasive particles. Honing differs from grinding in so far as in the former case only the tool is driven and the workpiece is carried along accordingly, whereby only one flank can inevitably be machined. Quite generally, a flexible honing or polishing tool has the advantage that one can obtain an improvement in surface roughness without having to set excessive requirements on the exactness of the synchronizing gear. An elastic tool is also capable of adapting to, or compensating, certain desirable profile deviations.

The present invention has as its object reducing the machining times for production of ground and polished gearwheels beyond the values obtainable up to now.

This object is achieved according to the invention by the features of the main claim. The essence of the invention consists in the use of a novel tool on the basis of a fundamentally known hob grinding machine, the tool being characterized in that it has a grinding worm and a polishing worm spaced axially one behind the other on one and the same tool spindle, the tooth profiles of said worms being substantially identical and their spirals extending along a common uninterrupted helical line. Once synchronised, the gearwheel to be machined can engage successively the grinding worm and polishing worm without any need for reclamping and refitting.

Due to the combination of the grinding worm and the polishing worm, the functions of these two tools can be clearly separated, i.e. the polishing worm does not cause any more stock removal at all. The polishing worm can be so soft that it actually only improves the surface roughness and adapts perfectly to the existing flank geometry.

It is also of importance that the helical surfaces or spiral path of the grinding worm continues without interruption in the polishing worm, the axial separator between the grinding and polishing worms being bridged by an "imaginary" spiral piece. Only this makes it possible to dispense with resynchronization for the polishing worm to fit into the gearwheel.

Although the tooth profile of the polishing worm should be substantially identical to that of the grinding worm, deviations are possible, for example to increase the flank pressure between the tool and the workpiece.

The elasticity of the polishing worm used allows for the surface roughness of the workpiece flank to be improved without any need for additional machine movements and without the flank geometry of the tool having to be changed.

The particular advantages of using a flexible polishing worm are also seen, for instance, in the fact that temperature-related displacements of the tool relative to the workpiece are compensated in the range of about 20 micrometers so that there is always reliable contact between the workpiece and the tool.

Compared to a fine but hard grinding worm there is the further advantage that the theoretical point of contact between the workpiece and the tool is enlarged into a contact surface. Within this surface relative movements of the grinding material occur relative to the workpiece flank which do not have the same direction of the markings produced during the preceding fine machining. These markings or ghost lines can therefore be machined better in practice.

The tool, i.e. the polishing worm, preferably consists of a metal bushing to allow for firm clamping on the tool spindle. The actual spirals consist of an elastic synthetic material in which the abrasive is embedded. A thermoplastic can be used as the synthetic material; silicon carbide, special fused alumina or any other suitable material can be used for the abrasive. The optimum grain size distribution and degree of filler in the synthetic material matrix can be determined depending on the application by simple experimental runs.

The elasticity (Shore hardness) of the material must be selected such that the flanks of the tool can compensate a roughness of the premachined gearwheel of about ±30 micrometers.

To dress the tool one can use, for example, a master wheel coated with mechanically resistant material, as is used for dressing grinding wheels and other tools. However, the synthetic material and the abrasive can preferably be coordinated with each other so as to produce a self-redressing effect. This method of dressing has the advantage that the tool geometry adapts automatically to the workpiece geometry without any need for special dressing means.

Further advantageous developments of the invention are described in the subclaims.

Figure 2:
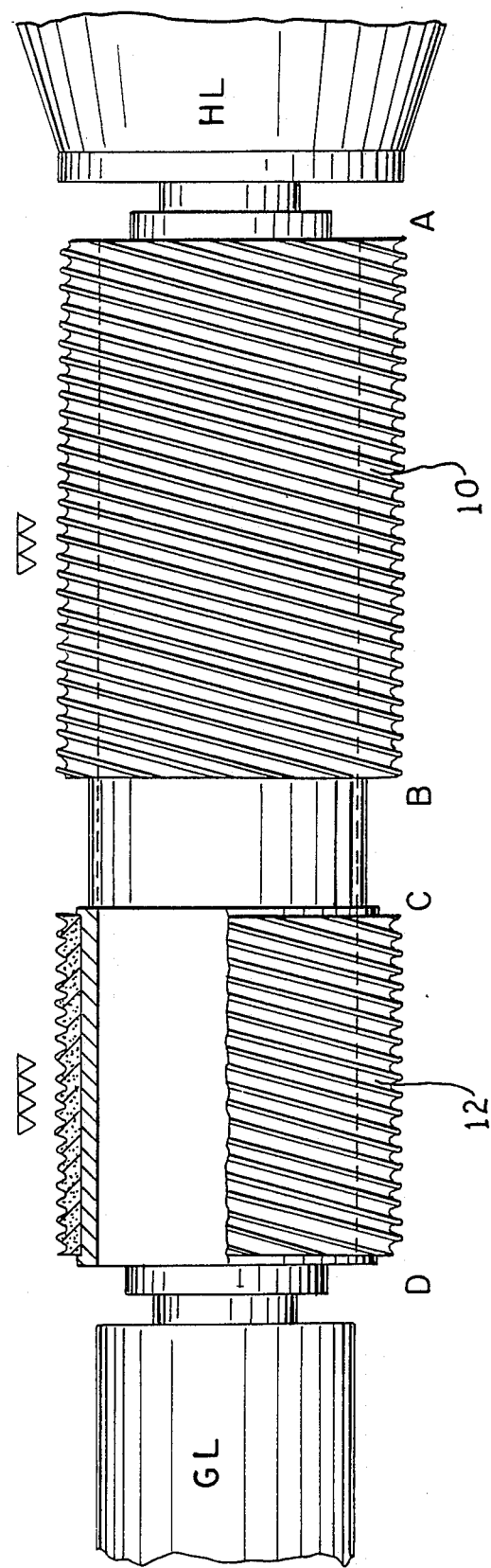

In the following, an embodiment of the invention shall be described by way of example with reference to the adjoined drawing, in which FIG. 1 shows a schematic view of a hob grinding machine, FIG. 2 shows a schematic view of a tool spindle on which a polishing worm and a grinding worm are disposed one behind the other.

Figure 3:
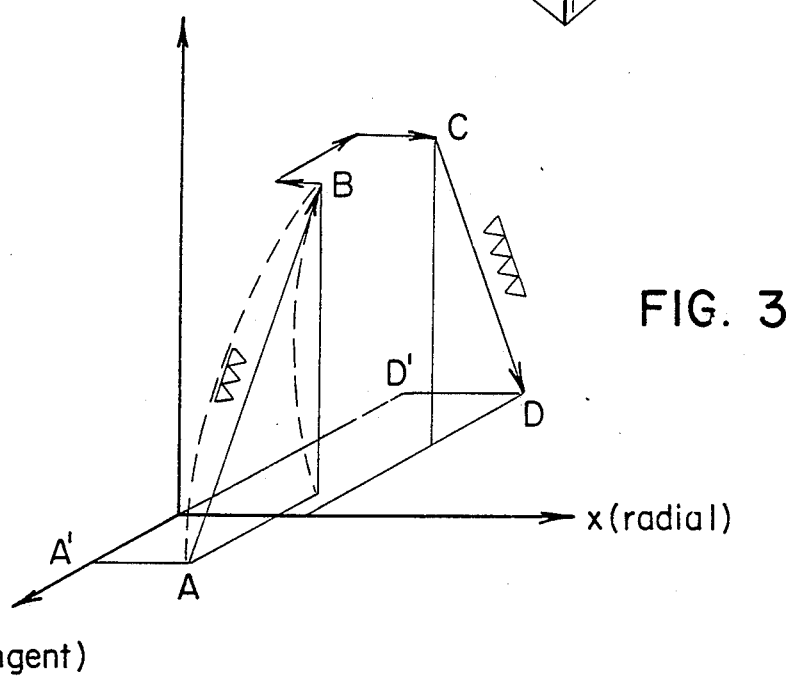

FIG. 3 shows a path diagram of the tool spindle of FIG. 2 when traversing a tooth space by the diagonal hobbing method.

The machine on which the polishing worm is used can be, for example, a hob grinding machine shown in FIG. 1. Continuously operating hob grinding machines are equipped with a grinding worm as a tool that rotates in the direction of arrow. The method, that is also referred to as helical hob grinding, is identical to the known hobbing.

On the machine bed there is a stationary work table on which a pretoothed gearwheel is clamped by a suitable clamping means with a vertical axis. The workpiece can be rotated about its vertical axis to enter into rolling coupling with the tool worm. The movement is symbolized by the arrow marked 2.

The radially displaceable main standard (the radial feed direction is symbolized by the arrow marked 3) bears a tangential slide for tangentially displacing the tool worm (this displacement direction is marked by the arrow referred to as 5). The tangential slide can also be moved axially (arrow 4) and swivelled about a horizontal axis (arrow 6).

On the tool slide or tangential slide a grinding worm 10 is firmly clamped before a polishing worm 12 on the tool spindle between end support (GL) and main bearing (HL). Between the grinding worm and the polishing worm there is a short spacer sleeve to ensure that one worm can move out cleanly and the other worm can move in.

Grinding worm 10 is a rigid metal worm having, for example, a carbide coating. The flank geometry of the grinding worm preferably varies along its axial length in order to effect corresponding flank corrections when traversing the tooth space.

The polishing worm, on the other hand, is made of an elastic synthetic material. The tooth profile of the spirals is constant along the axial length. Otherwise the worms have the same diameter, number of starts and helix angle, certain deviations from the diameter and helix angle being possible.

FIG. 3 shows the path-time diagram of the tool spindle relative to the gearwheel. The three coordinate axes refer to movement in the tangential, axial and radial directions.

From D' to A' the workpiece is changed and the grinding worm fitted into a tooth space of the pretoothed work wheel. After radial feed from A' to A the diagonal stroke begins with a tangential and an axial speed component from A to B. In reality, the covered path is not exactly straight but slightly curved to produce a certain lateral crowning of the tooth flanks. This curved path is indicated by a broken line. Upon arrival at point B the tool spindle moves out followed by a short axial movement and a new radial fitting in, thereby causing the first spirals of the polishing worm to engage the corresponding tooth spaces of the work wheel. Upon reversal of the tool slide from C to D all tooth spaces of the work wheel are treated, i.e. polished.

While the grinding worm, due to its abrasive effect and its flank geometry varying along its axial length, effects corresponding corrections and removal on the work wheel, the polishing worm only reduces the surface roughness.

The inventive method was carried out, for example, on a gearwheel having 35 teeth, a helix angle of 33°, a modulus of 2 mm and a tooth width of 14.7 mm. The worm diameter was 140 mm. The gearwheel also had an overmeasure of 0.12 mm per flank.

The speed of the tool spindle may be 10,900 revolutions per minute, which results in a circumferential speed of 80 m/s. The speed of the work table may be 312 revolutions per minute.

The path feed per workpiece rotation is 1 mm; the grinding process lasts altogether 6 seconds.

For polishing during the return stroke the same speeds are used, the only difference being that the feed per workpiece rotation is reduced to 0.8 mm. Grinding takes altogether 8 seconds. The nonproductive times are 4 seconds in the described case, so that the total machining time for the gearwheel is 18 seconds.

The above-mentioned values are of course only by way of example. Depending on the type of material and the dimensions of the gearwheel other parameters must be set.

I claim:

1. A machine for fine machining the tooth flanks of pretoothed gearwheels, said machine comprising:
   a carrier for receiving the gearwheel to be fine machined, said carrier having means for driving the gearwheel in a rotary manner about the axis thereof;
   a tool comprising a spindle mounting a grinding worm and a polishing worm, said polishing worm being displaced from said grinding worm along the axis of said spindle;
   a tool slide for receiving said tool and having means for rotating said tool about the axis of said spindle, said tool slide being movable radially and tangentially with respect to the gearwheel and axially along the gearwheel, said tool slide moving said tool radially into engagement with the gearwheel, said tool slide moving said tool tangentially of the gearwheel in a given direction for sequentially engaging said grinding worm and polishing worm in the gearwheel, said tool slide moving said tool with an axial component in one direction when said grinding worm engages the gearwheel while simultaneously moving said tool tangentially in said given direction, only said grinding worm engaging the gearwheel during movement tangentially in the given direction and with the axial component in the one direction, said tool slide moving the tool with an axial component in the other direction when said polishing worm engages the gearwheel while simultaneously moving said tool tangentially in said given direction, only said polishing worm engaging the gearwheel during movement tangentially in the given direction and with the axial component in the other direction; and means for synchronizing the rotation of the gearwheel and said tool for securing the engagement of the latter with the former.

2. The machine according to claim 1 wherein said grinding worm has a helical groove on the exterior thereof, said grinding worm having a metal base coated with grains of hard material, said tool having an axial separator between said grinding worm and polishing worm, said axial separator having a diameter less than that of said grinding worm and polishing worm, said polishing worm having a helical groove on the exterior thereof, said polishing worm being formed of a flexible synthetic material with embedded grains of hard material, said grooves of said grinding and polishing worms having the same pitch.

3. The machine according to claim 2 characterized in that the polishing worm and the grinding worm have a substantially identical tooth profile.

4. The machine according to claim 1 characterized in that said tool has a metal bushing engaging said tool spindle.

5. The machine according to claim 2 characterized in that the synthetic material is a thermoplastic.

6. The machine according to claim 2 characterized in that the embedded hard material of said polishing worm is silicon carbide, tungsten carbide, or fused alumina.

7. The machine according to claim 2 characterized in that the hardness and abrasive properties of the synthetic material are selected such that abrasion brings about a self-redressing effect.

8. The machine according to claim 2 wherein said polishing worm and grinding worm have different tooth profiles.

9. The machine according to claim 1 wherein the flank geometry of said grinding worm varies along the axial length of said grinding worm.

10. The machine according to claim 1 wherein the tooth profile of said polishing worm is constant along the axial length of said polishing worm.

11. The machine according to claim 1 wherein said grinding worm is generally in the form of a cylinder with an axis, said grinding worm having a multiple turn, helical groove on the cylindrical exterior thereof; said polishing worm is generally in the form of a cylinder resembling the cylinder of the grinding worm, said polishing worm cylinder having an axis, said polishing worm having a multiple turn, helical groove on the cylindrical exterior thereof corresponding to that of said grinding worm, said helical grooves of said grinding and polishing worms having the same pitch; and wherein said tool has a cylindrical axial separator having a diameter less than that of said grinding worm and said polishing worm; said grinding worm, said polishing worm, and said separator being arranged in axial alignment with said separator between said worms, said grinding worm and polishing worm being angularly oriented about the axes of said worms such that said grooves of said grinding worm and polishing worm form a continuous helix on the exterior of said tool that is interrupted by said separator.

* * * * *